United States Patent [19]

Klinkowski

[11] Patent Number: 4,670,118
[45] Date of Patent: Jun. 2, 1987

[54] ELECTRODE ASSEMBLY AND PROCESS FOR ELECTRICALLY AUGMENTED VACUUM FILTRATION

[75] Inventor: Peter R. Klinkowski, Norwalk, Conn.

[73] Assignee: Dorr-Oliver Incorporated, Stamford, Conn.

[21] Appl. No.: 222,057

[22] Filed: Jan. 2, 1981

[51] Int. Cl.⁴ .................... B01D 13/02; C25D 21/06; C02F 1/44
[52] U.S. Cl. ..................... 204/182.2; 204/182.4; 204/182.5; 204/266; 204/283; 204/296; 204/301; 210/321.1; 210/321.2; 210/748
[58] Field of Search ............... 204/283, 301, 258, 266, 204/180 P, 282, 182.2, 182.4, 182.5; 210/748, 321.1, 321.2

[56] References Cited

U.S. PATENT DOCUMENTS

| | | | |
|---|---|---|---|
| 3,079,318 | 2/1963 | Bier | 204/301 X |
| 3,827,964 | 8/1974 | Okubo et al. | 204/283 X |
| 3,920,534 | 11/1975 | Jensen et al. | 204/301 X |
| 4,105,534 | 8/1978 | Beatty, III | 204/180 P X |
| 4,229,280 | 10/1980 | Horn | 204/301 |
| 4,243,501 | 1/1981 | Wright, Jr. | 204/182.4 |
| 4,284,493 | 8/1981 | Case et al. | 204/301 |

FOREIGN PATENT DOCUMENTS 0056082  5/1977  Japan .................. 204/301

Primary Examiner—Donald R. Valentine
Attorney, Agent, or Firm—Paul D. Greeley

[57] ABSTRACT

An electrode assembly for use in dewatering a suspension of solids in which an electric field augments an applied vacuum includes a chamber having walls comprising an ion exchange membrane on which a cake of solids is deposited and an electrode element with the chamber immersed in an electrolyte.

27 Claims, 3 Drawing Figures

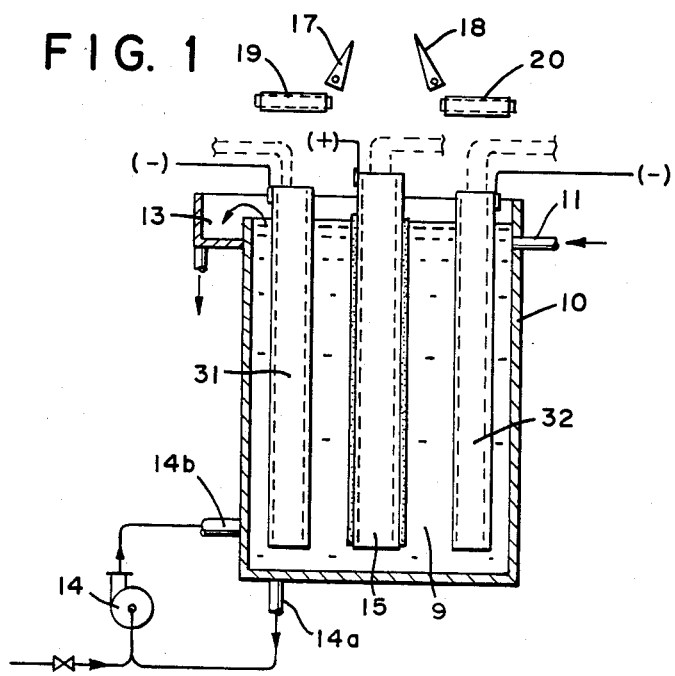
FIG. 1
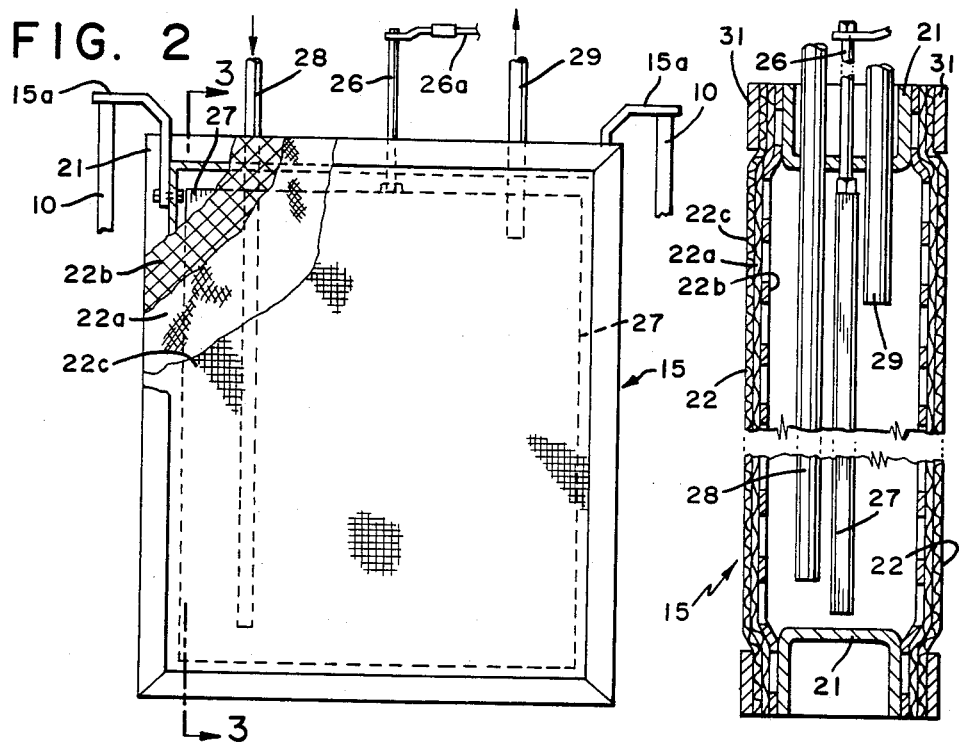
FIG. 2
FIG. 3

ELECTRODE ASSEMBLY AND PROCESS FOR ELECTRICALLY AUGMENTED VACUUM FILTRATION

This invention is directed to an improved electrode assembly for use in dewatering suspensions of finely divided or colloidal solids in a carrier liquid, for example, a koalin suspension in water, by application of vacuum, with the vacuum dewatering process augmented by an electric field created by passing an electric current through the suspension by means of a pair of spaced electrodes submerged in the suspension.

Process and apparatus for carrying out dewatering of suspensions is disclosed in U.S. Pat. No. 4,168,222, issued Sept. 18, 1979, U.S. Pat. No. 4,207,158, issued June 10, 1980 and copending application Ser. No. 109,931, filed Jan. 4, 1980, now U.S. Pat. No. 4,303,492. In these earlier disclosures, self-contained hollow electrode assemblies are provided which are normally submerged in the suspension, but bodily removable therefrom for inspection or other purposes. These hollow electrodes comprise two types of wall surfaces: ion-pervious walls for electrode assemblies of one polarity and liquid-pervious walls for electrode assemblies of the opposite polarity. The wall surfaces of the electrode assemblies comprise chemically and electrically neutral filter media or permeable porous membrane backed by a supporting grid, thus presenting a planar electrode surface.

In operation, with electrode assemblies of both types immersed in the suspension, a source of vacuum is connected to the interior of the electrode assemblies having liquid-pervious walls to provide a controllable pressure differential thereby producing a flow of carrier liquid through the filtration surfaces, while the solids migrate in the opposite direction, under the influence of the electric field, to deposit as cake upon the electrode assemblies having ion-pervious walls. Filtrate liquid, that is, carrier liquid freed of solids, is withdrawn or pumped from the interior of the liquid-filled hollow electrode structure at a controllable rate.

As indicated, cake deposition occurs on the hollow electrode assemblies having ion-pervious surfaces; these electrode assemblies being filled with a electrolyte and having an electrode element therein immersed in the electrolyte, isolated from direct contact with the suspension. The electrolyte is specially selected for high conductivity and compatibility with the electrode element. By compatibility is meant the relatively non-corrosive character of the electrolyte under the conditions that ordinarily prevail within the hollow electrode assembly. Since decomposition or evolution products and heat are generated at the electrode element within the hollow ion-pervious electrode assembly, provision is made for a flow of electrolyte into and through the electrode chamber so that such foreign products and heat are swept out of the chamber and a relatively constant predetermined electrolyte composition is maintained.

The ion-pervious wall of the electrode assembly in these prior art structures comprises a chemically and electrically neutral filter media or permeable porous membrane which, if film-like in nature or otherwise requiring support, may be backed by a chemically and electrically neutral grid so that a planar electrode filter surface is presented to the slurry being treated. Since the cake will form on this electrode during electrofiltration and must be removed by contact with doctoring blades, a friction cage or spacing means may be provided to protect the filter medium from direct contact with the doctoring blades. The friction cage comprises a thin, open screenwork of relatively hard material covering the filter medium for contact with the doctoring blades while spacing means may comprise strips of plastic materials, such as Delrin acetal resin arranged in a frame-like configuration and of a thickness sufficient to prevent contact between the doctor blade and the filter medium. For the purpose of cake recovery, the electrode assembly may be raised to a position of emergence from the suspension, with the layer of collected solids or cake layer adhering thereto. Since the electrolyte remains within the electrode assembly in the raised position, a vacuum is applied internally of the electrode to reduce the pressure on the filter media and so prevent rupture of the filter media. When the electrode assembly is immersed in operation, the vacuum applied internally serves to remove gaseous products, such as chlorine or carbon dioxide evolved at the electrode element.

The ion-previous electrode structures of the prior art applied in the field of clay dewatering exhibit certain operating problems. Since the clay particles in the feed material are of colloidal particle size, a significant amount of such clay particles pass through the filter medium. This clay accumulates in the chamber of the electrode assembly, contaminates the electrolyte circulating through the clay and restricts and blocks flow of electrolyte through the electrode chamber. Ultimately, the electrode assembly must be taken out of operation, disassembled, cleaned and reassembled, a time-consuming and expensive procedure. Further, it has been found that, electrolyte is being pumped from the chamber of the electrode assembly into the bath. This infusion of material into the bath materially and adversely affects the properties of the dewatered product. There is thus a clear need for an electrode assembly which would operate without these disadvantages.

Accordingly, it is an object of this invention to provide an improved electrode assembly for carrying out an electrofiltration process.

Other objects and advantages of the present invention will become apparent from the following description taken in conjunction with the accompanying drawings, in which:

FIG. 1 is a schematic view of an electrofiltration apparatus incorporating the electrode assembly of the invention, FIG. 2 is a detailed view of the improved electrode assembly of the invention and FIG. 3 is a view taken along line 3—3 of FIG. 2.

Generally speaking, the electrode assembly of the invention for immersion in a suspension of solids comprises a chamber having at least one wall composed of an ion-exchange membrane with at least one electrode element within the chamber immersed in an electrolyte.

In the following description, the electrode assembly will be termed an anode assembly for convenience, although it will be understood that the unit may be cathodic for certain dewatering operations. In the case of the anode assembly, a cation exchange membrane is employed whereas, if the unit is cathodic, an anion membrane is used.

Referring to the drawings, there is shown schematically in FIG. 1 an electrically augmented vacuum dewatering apparatus of the kind to which this invention is directed having a tank 10 containing a bath 9 of suspended solids with a pair of cathodes 31 and 32 immersed in the bath 9 on opposite sides of an electrode assembly 15. The tank 10 is provided with a supply connection 11 for feeding the suspension to the tank. This may be a clay suspension or a suspension of uniformly dispersed finely divided negatively charged solids of colloidal size. The required depth of the body of the suspension in the tank is defined and insured by an overflow edge 12 associated with an overflow receiving launder 13, providing for full submergence of electrode structures in the tank. Accordingly, feed suspension is supplied at a rate such that an excess will continuously overflow from the tank, and so that there will be an everchanging body of the suspension in the tank. Moreover, a circulating pump 14 connected to the tank as at 14a and 14b, keeps the tank contents in motion, thus insuring suitable dispersion of the solids in suspension, and proper and uniform functioning of the cathodic and anodic electrode surfaces exposed to the suspension in the tank.

Cathodic and anodic electrode surfaces in the form of self-contained electrode structures of planar configuration, parallel to one another, are thus provided each being construction and arranged so that it may be raised vertically in its own plane to a position of emergence from the suspension, and again to be lowered back into the suspension.

In the present case, that is with suspended solids such as clay carrying a negative charge, the self-contained anodic electrode structure 15 of positive polarity and of hollow construction, occupies the center, as stated above.

Provision is made for a vertical guide arrangement (not shown) in order to move this electrode structure vertically in its own plane to a position of emergence from the suspension, and to lower it back into submergence. Also provided are disposal devices whereby cake material formed on the anodic electrode surfaces from the suspension, is stripped and carried away during the downward return movement of the electrode structure. In one embodiment, these disposal devices are schematically shown to comprise a pair of symmetrically disposed doctor blades 17 and 18 swigable about their horizontal axes as between neutral position and cake stripping position. The cake material thus being stripped may be carried away by conveying means indicated by respective band conveyers 19 and 20. Of course, the stripping devices may also be constructed and arranged in a manner whereby the cake stripping and removal is effected incident to the upward movement of the electrode structure to emergence. In greater detail shown in FIGS. 2 and 3, the anodic electrode structure 15 is of a hollow construction comprising a rectangular frame member 21 and a pair of walls 22 comprising a membrane 22a composed of a negatively charged ion exchange resin connected to the frame member 21. Frame member 21 is of an outwardly open U-shaped cross-section adapted for securement thereto of the ion-permeable walls. Each of the walls 22 is a multi-layered assembly comprising a cation exchange member 22a, a supporting grid 22b and a protective cage 22c, and adapted for deposit thereon of negatively charged solids from the suspension, as a layer or a cake formation.

Fixed to the upper end of frame member 21 are a pair of support brackets 15a for positioning and supporting the electrode structure 15 in the tank 10.

A terminal of positive polarity is provided in the form of vertical rod 26 extending into the interior of this electrode 27 while the exposed top end portion of this rod has a cable connection 26a.

It will be understood that the frame member 21 and the wall members 22 of the electrode structure 15 are electrically neutral and are, consequently, composed of non-conductive materials such as plastic, or are insulated from contact with the electrode 27 and the electric conduits 26 and 26a.

Provision is furthermore made for filling the interior of this electrode structure with a suitable electrolyte (anolyte). In order to maintain a relatively constant electrolyte composition during operation of the electrically augmented vacuum filter, a flow of fresh electrolyte is maintained through the electrode structure. The apparatus for maintaining this electrolyte flow, in simplest form, may be a gravity feed system in which an elevated electrolyte supply tank is connected to the electrode structure by a supply conduit 28 and a waste conduit 29 leads from the electrode structure, perhaps to a waste tank. Gas evolved at the anode is carried out with the depleted electrolyte. Electrolyte circulation may be provided in more sophisticated systems. In some cases, it may be desirable to separate the anode gases from the anolyte and inject the gases into the catholyte (for pH control or for other purposes).

The ion-exchange resin membrane employed in the electrode assembly of the invention is impervious to the mass flow of solids and liquids. Therefore, clay particles will not gain entrance into the interior of the anode chamber to contaminate the anolyte. Further, mass flow of anolyte into the bath will not occur. (However, under the influence of the electric field applied during electrofiltration, electroosmosis does occur resulting in the introduction of some portion of the anolyte into the bath. This effect is at least half, and frequently an order of magnitude less than the mass flow of anolyte observed with prior art membranes.) A number of cation exchange membranes are commercially available, but perfluorosulfonic acid membranes sold by E. I. Dupont de Nemours & Company under the trademark NAFION have been found to be especially suitable.

An electrofiltration anode assembly is modified by stretching and securing NAFION membrane over one side of the anode and blinding the reverse side of the anode. The NAFION has been pretreated in NaCl at 48.9° C. for one hour. The feed material is a clay slurry having a 5 micron particle size with ammonium polyacrylate as a dispersant. The dewatering operation was continued over nearly a four hour period under the conditions indicated below and a relatively constant filtrate rate (dewatering) was observed.

TABLE I

| Time | Voltage | Amps | Vacuum | Bath Temp. | Filtrate Rate |
|---|---|---|---|---|---|
| 8:20 | 60 | 6.0 | 9" | | On |
| 8:55 | 60 | 6.0 | 9" | 31° C. | 1010 cc/20 minutes |
| 9:25 | 58 | 6.6 | 9" | 37° C. | |
| 10:05 | 60 | 6.0 | 6" | 37° C. | |
| 10:35 | 60 | 6.0 | 7" | 40° C. | |
| 11:10 | 59 | 6.2 | 8" | 43° C. | |
| 11:30 | | | | | 1000 cc/20 minutes |
| 11:40 | 60 | 6.4 | 6.5" | 41.5° C. | |
| 12:00 | Terminated | | | | |

In Table II below, pH, conductivity and % solids measurements are set forth for the feed, filtrate, bath and cake involved in this dewatering process.

TABLE II

| Sample | Time | pH | Conductivity (m mhos cm$^{-1}$) | % Solids |
|---|---|---|---|---|
| Feed | 8:20 | 8.5 | 2,700 | 36.3 |
| Filtrate | 10:45 | 12.2 | 6,300 | — |
| Bath | 11:15 | 9.1 | 2,800 | 35.7 |
| Cake | 11:30 | 8.9* | 710* | 75.0 |
| Bath | 11:40 | 9.2 | 2,700 | 36.0 |
| Filtrate | 11:40 | 12.2 | 5,950 | — |
| Cake | 11:40 | — | — | 74.0 |
| Anolyte | 12:30 | 1.3 | 117,000 | — |

*Reblunged cake to 13% solids using deionized water.

Comparing the bath conductivity (2,700–2,800 during the test with the anolyte conductivity (117,000), it is seen that the cation exchange membrane obviates intrusion of anolyte into the bath.

The performance of an anode assembly furnished with a cation exchange membrane (NAFION) is compared in Table III below with the performance of an anode assembly provided with a prior art ion-previous membrane (Dynel) in dewatering a 5 micron clay slurry containing ammonium polyacrylate as a dispersant.

TABLE III

| | Prior Art Membrane | Cation Exchange Membrane |
|---|---|---|
| Temperature | 25.5° C. | 41.5° C. |
| Feed | | |
| Solids (wt %) | 36.3 | 36.3 |
| Conductivity (m mho cm$^{-1}$) | 2700 | 2700 |
| pH | 8.5 | 8.5 |
| Throughput | | |
| Dry (tn/hr) at 9876 amp | 2.75 | 3.74 |
| Wet (gal/hr) | 1420 | 1930 |
| Filtrate | | |
| Solids (sw %) | 0.0 | 0.0 |
| pH | 12.5 | 12.2 |
| Rate (gal/hr) at 9876 amps | 940 | 1260 |
| Solid Product | | |
| Solids (wt %) | 75 | 74.5 |
| Rate (tn/hr) at 9876 amps | 2.75 | 3.74 |
| Bath | | |
| Solids (wt %) | 38.0 | 36.0 |
| pH | 9.4 | 9.2 |
| Conductivity (m mhos cm$^{-1}$) | 2690 | 2700 |
| DC requirements | | |
| Product (Kwh/ton dry) | 156 | 158 |
| Filtrate (Kwh/Kgal) | 458 | 468 |

From the data presented in Table III it can be stated that the performance of the cation exchange membrane is generally comparable to the performance of prior art membranes. While the solid products rate using the cation exchange membrane is higher than the rate achieved with the prior art membrane, this difference can be accounted for largely by the difference in operating temperatures. However, it was observed that no clay passed into the electrode assembly as invariably occurs with the prior art membranes. Further, little or no anolyte intruded into the cake, in contrast to the losses customarily experienced when using the prior art membranes.

Although the present invention has been described in conjunction with preferred embodiments, it is to be understood that modification and variation may be resorted to without departing from the spirit and scope of the invention as those skilled in the art will readily understand.

I claim:

1. An electrode assembly for electrically augmented vacuum filtration of a clay slurry in a carrier liquid, which comprises:
   a non-conductive frame structure supporting the walls of an electrode chamber,
   means for circulating an electrolyte having a high conductivity through said electrode chamber,
   at least one electrode element within said electrode chamber electrically connected to a voltage source external of said electrolyte in such a way as to render said electrode assembly anodic and immersed in said electrolyte, and
   at least one of said walls of said electrode chamber including an ion exchange membrane and said ion exchange membrane separating said electrolyte and the electrode element immersed therein from said clay slurry.

2. The electrode assembly of claim 1 wherein said ion exchange membrane comprises a cation exchange membrane.

3. The electrode assembly of claim 1 wherein said ion exchange membrane comprises a perfluorosulfonic acid polymer.

4. An electrode assembly for electrically augmented vacuum filtration of a suspension of solids in a carrier liquid, which comprises:
   a non-conductive frame structure supporting the walls of an electrode chamber,
   means for circulating an electrolyte having a high conductivity through said electrode chamber,
   at least one electrode element within said electrode chamber electrically connected to a voltage source external of said electrolyte in such a way as to render said electrode assembly cathodic and immersed in said electrolyte, and
   at least one of said walls of said electrode chamber including an ion exchange membrane and said ion exchange membrane separating said electrolyte and the electrode element immersed therein from said suspension of solids.

5. The electrode assembly of claim 4 wherein said ion exchange membrane is an anion exchange membrane.

6. An electrode assembly for electrically augmented vacuum filtration of a suspension of solids in a carrier liquid, which comprises
   a non-conductive frame structure supporting the walls of an electrode chamber,
   means for circulating an electrolyte having a high conductivity through said electrode chamber,
   at least one electrode element within said electrode chamber electrically connected as an anode to a voltage source external of said electrode chamber and immersed in said electrolyte and
   at least one of said walls including an ion exchange membrane.

7. The electrode assembly of claim 6 wherein said ion exchange membrane comprises a cation exchange membrane.

8. The electrode assembly of claim 6 wherein said ion exchange membrane comprises a perfluorosulfonic acid polymer.

9. A system for electrically augmented vacuum filtration of a suspension of solids wherein a pair of electrode structures of opposite polarity are in contact with a body of said suspension of solids, one of said electrode structures comprising a chamber having a liquid-pervious wall through which carrier liquid from said suspension of solids is drawn as filtrate under the influence of vacuum and the second electrode structure comprising a chamber through which electrolyte is circulated to contact the electrode element of said second electrode structure and having an ion-pervious wall through which ions pass from the suspension of solids to said electrode element under the influence of the electric field established between said electrode structures, the improvement comprising incorporating an ion exchange membrane in the ion-pervious wall.

10. The system according to claim 9, wherein said second electrode structure is anodic.

11. The system according to claim 10, whererin said ion exchange membrane is a cation exchange membrane.

12. The system according to claim 9, wherein said second electrode structure is cathodic.

13. The system according to claim 12, wherein said ion exchange membrane is an anion exchange membrane.

14. An improved process for electrically augmented vacuum filtration of a suspension of solids in a carrier liquid which comprises:

dewatering said suspension of solids by means of a system for electrically augmented vacuum filtration, wherein a pair of electrode structures of opposite polarity are in contact with a body of said suspension of solids, one of said electrode structures comprising a chamber having a liquid-pervious wall through which carrier liquid from said suspension of solids is drawn as filtrate under the influence of vacuum and the second electrode structure comprising a chamber through which electrolyte is circulated to contact the electrode element of said second electrode structure and having an ion exchange membrane wall through which ions pass from the suspension of solids to said electrode element under the influence of the electric field established between said electrode structures.

15. The process of claim 14 wherein said second electrode structure is anodic.

16. The process of claim 14 or 15 wherein said ion exchange membrane comprises a cation exchange membrane.

17. The process of claim 16 wherein said ion exchange membrane comprises a perfluorosulfonic acid polymer.

18. The process of claim 14 wherein said second electrode structure is cathodic.

19. The process of claim 18 wherein said ion exchange membrane is an anion exchange membrane.

20. In a system for dewatering a suspension of particulate solids such as hydrous kaolin clay using a known electrically augmented vacuum filter apparatus comprising a tank adapted to receive and discharge suspension to be filtered, an anodic and cathodic electrode structures adapted to be positioned in said tank in a manner such as to be submerged in suspension in said tank in a manner such as to be submerged in suspension in said tank, said anodic electrode structure being adapted for deposition thereon of filter cake and including an anodic element, electrically nonconductive housing surrounded by a filter medium for said anodic element and means for supplying anolyte into and out of said housing, said cathodic electrode structure including a cathodic element and being surrounded by a filter medium adapted for the passage therethrough of filtrate, the improvement which comprises a perm-selective membrane associated with said anodic structure in a manner such as to permit passage of cations from said anolyte therethrough and into and through said filter cake and suspension to be filtered while substantially preventing passage of anions and gaseous electrochemical reaction products from said anolyte therethrough and into filter cake deposited on said anodic structure.

21. The system of claim 20 wherein said perm-selective membrane or membranes comprises a perfluorosulfonic acid polymeric film.

22. An improved process for dewatering a suspension of particulate solids which comprises:

dewatering said suspension of particulate solids by means of a system for electrically augmented vacuum filtration, wherein an anodic and cathodic electrode structures are in contact with a body of said suspension of particulate solids, said anodic electrode structure being adapted for deposition thereon of a filter cake and including an anodic element, electrically nonconductive housing surrounded by a filter medium for said anodic element, means for supplying anolyte into and out of said housing, and a perm-selective membrane associated with said anodic electrode structure in a manner such as to permit passage of cations from said anolyte therethrough and into and through said filter cake and suspension to be filtered while substantially preventing passage of anions and gaseous electrochemical reaction products from said anolyte therethrough and into filter cake deposited on said anodic electrode structure, said cathodic electrode structure including a cathode element and being surrounded by a filter medium adapted for the passage therethrough of filtrate.

23. The process in accordance with claim 22 wherein said suspension comprises a deflocculated aqueous suspension of clay.

24. The process of claim 22 wherein said clay is hydrous kaolin clay.

25. The process of claim 22 wherein said anolyte is sodium chloride.

26. The process of claim 22 wherein said anolyte contains sodium ions and said membrane is permeable thereto.

27. The process of claim 22 wherein said perm-selective membranes associated with said anode structure comprise a perfluorosulfonic acid polymeric film.

* * * * *

UNITED STATES PATENT AND TRADEMARK OFFICE
CERTIFICATE OF CORRECTION

PATENT NO. : 4,670,118
DATED : June 2, 1987
INVENTOR(S) : Peter R. Klinkowski

It is certified that error appears in the above-identified patent and that said Letters Patent are hereby corrected as shown below:

ON THE COVER SHEET, IN THE HEADING THEREOF, CHANGE "KLINKOWSKI" TO READ --KLINKOWSKI ET AL--.

AT ENTRY [75] ON THE COVER SHEET ADD AFTER "CONN.", --PAUL L. STAVENGER, WESTPORT, CONN., JONATHAN K. HOADLEY, STAMFORD, CONN.--.

Signed and Sealed this

Fifteenth Day of November, 1988

Attest:

DONALD J. QUIGG

*Attesting Officer*  *Commissioner of Patents and Trademarks*